United States Patent [19]

Benzie

[11] Patent Number: 4,876,821
[45] Date of Patent: Oct. 31, 1989

[54] MAGNETIC AUTOMATIC RESET ANIMAL TRAP

[76] Inventor: Paul Benzie, P.O. Box 244, Bellefonte, Pa. 16823

[21] Appl. No.: 290,457

[22] Filed: Dec. 27, 1988

[51] Int. Cl.$^4$ .................. A01M 1/12; A01M 23/14
[52] U.S. Cl. ........................................... 43/69
[58] Field of Search .................... 43/69, 64

[56] References Cited

U.S. PATENT DOCUMENTS

| 192,326 | 2/1923 | Grebe | 43/69 |
|---|---|---|---|
| 442,228 | 12/1890 | Jenne | 43/69 |
| 1,500,525 | 7/1924 | Pierini | 43/69 |
| 1,597,551 | 8/1926 | Stewart | 43/69 |
| 2,706,361 | 4/1955 | Peterson | 43/69 |
| 2,741,866 | 4/1956 | Shirley | 43/69 |
| 2,835,070 | 5/1958 | Gomez | 43/69 |
| 3,936,972 | 2/1976 | Meyers et al. | 43/69 |
| 4,748,766 | 6/1988 | Stimac | 43/69 |

Primary Examiner—M Jordan
Attorney, Agent, or Firm—Thomas E. Sterling

[57] ABSTRACT

This invention is a baited animal trap, positioned above a water reservoir and comprising a rotatable walkway held in position by a magnetic release device. Bait positioned beyond the walkway attracts an animal to walk thereon. The magnetic release device releases when an animal proceeds on the walkway causing the walkway to rotate and plunge the animal into the water reservoir. A reset device attached to the walkway causes the walkway to re-rotate to re-engage the magnetic release device and thus automatically resets the trap for the trapping of another animal.

5 Claims, 3 Drawing Sheets

U.S. Patent  Oct. 31, 1989  Sheet 1 of 3  4,876,821
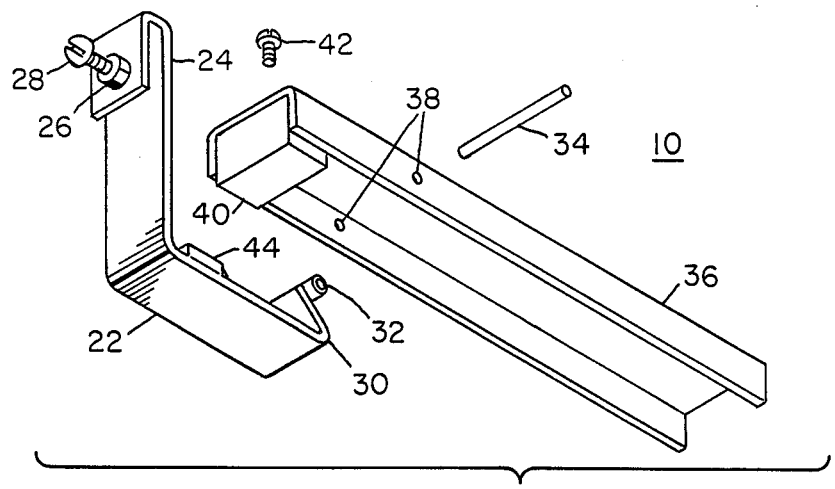
Fig. 3.
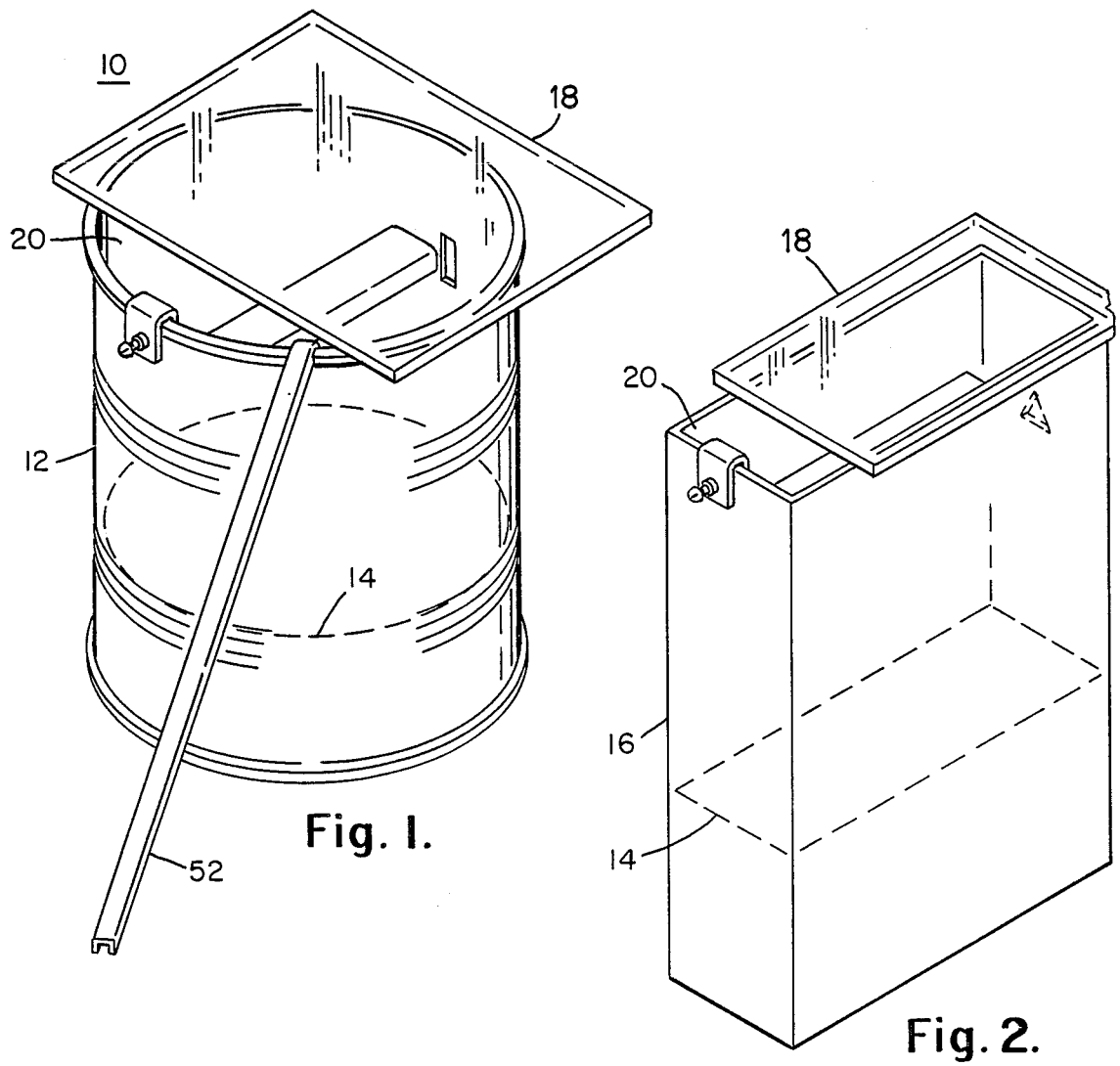
Fig. 1.
Fig. 2.

MAGNETIC AUTOMATIC RESET ANIMAL TRAP

PRIOR ART STATEMENT

The inventor knows of no uncited prior art anticipating this invention. The inventor is not withholding know prior art which he considers to anticipate this invention.

This invention relates to animal traps, and in particular to traps designed trapping small animals. The traps will automatically reset after being sprung allowing a second or subsequent animal to be trapped.

BRIEF SUMMARY OF THE INVENTION

Animal traps have been in existence for many years. Particularly animal traps designed to catch small animals, such as rats, mice or other rodents. These have been used by property owners to rid their area of pests. Many of these traps are of the single set variety. That is, once the trap is set, sprung and the animal caught, the trapp will not catch additional animals until it is again rest. Such examples of this type of trap may be seen in the spring loaded rat and mouse trap, often baited with cheese and other foods attractive to rats and mice. This type of trap when sprung allows a spring driven member to strike the tripping animal, thus killing it or securing it to the trap.

This particular type of trap secures the animal and makes it necessary to remove the animal from the trap, an often distasteful and unpleasant task for the trapper.

The present invention when activated by the animal, will drop the animal into water. The trap then automatically resets itself so that it is available for a second or subsequent animal to enter. The number of animals that may be trppaed and "stored" this way is limited only by the water containing element. As may be seen the trapped and dead animal may be easily disposed of with a minimum of handling by the trapper.

In general the present invention is comprised of a container, the bottom of which is filled with water to a sufficient depth so that the animal can not get its feet on the bottom to spring upward and out of the trap. The top portion of the container contains a pivoting walkway mechanism secured in place at one end by a magnetic device which holds the walkway approximately horizontal. Bait is placed on the side of the container at the end of the walkway to induce the animal to proceed down the walkway. When the weight of the animal is sufficient the magnetic device releases the end portion of the walkway allowing it to tilt upon its pivot and to drop the animal into the water reservoir below. The walkway is so balanced that it swings back to its original horizontal position and is again retained there by the magnetic device, thus resetting the trap and allowing a second animal to enter. A cover is placed on the top of the water container allowing an opening at the near end of the tilting walkway but preventing the animal from entering the trap in any other place. The trap may be baited by cheese, peanut butter, or other attractive materials positioned on a bait wedge at the inside of the water container.

This application teaches two species of the invention: (1) a contained rotatable walkway mechanism which may be clamped to the inside portion of almost any container. This might be a number 10 can and 55 gallon drum, or other container; (2) a self contained species of the invention adapted to be installed on the top of a canister.

The object of this invention therefore is to provide a magnetically releasable automatic resetting trap for small animals.

Another object of this invention is to provide a trapping mechanism which may be suspended over and clamped to a water containing device.

Still another object of this invention is to provide a safe trapping device for small animals which will not injure the user.

Still another object of this invention is to provide a clean and soundless trapping device which allows for the easy disposing of trapped animals.

Yet another object of this invention is to provide a rat or mouse type trap for the easy trapping of small animals.

Another object of this invention is to provide a trap which is easily clampable upon a water container or other object.

Yet another object of this invention is to provide a simple effective and inexpensive animal trap.

These and other objects of the invention will become obvious by the examination of the following specification, claims and drawings, in which:

FIG. 1, is a third dimensional view of one species of the animal trap of this invention mounted upon a round can containing water.

FIG. 2, is a third dimensional view of the same species of the trap mounted on the top portion of a rectangular cylindrical water container.

FIG. 3, is a third dimensional exploded view of the trap mechanisms shown in FIGS. 1 and 2.

Figure 4:
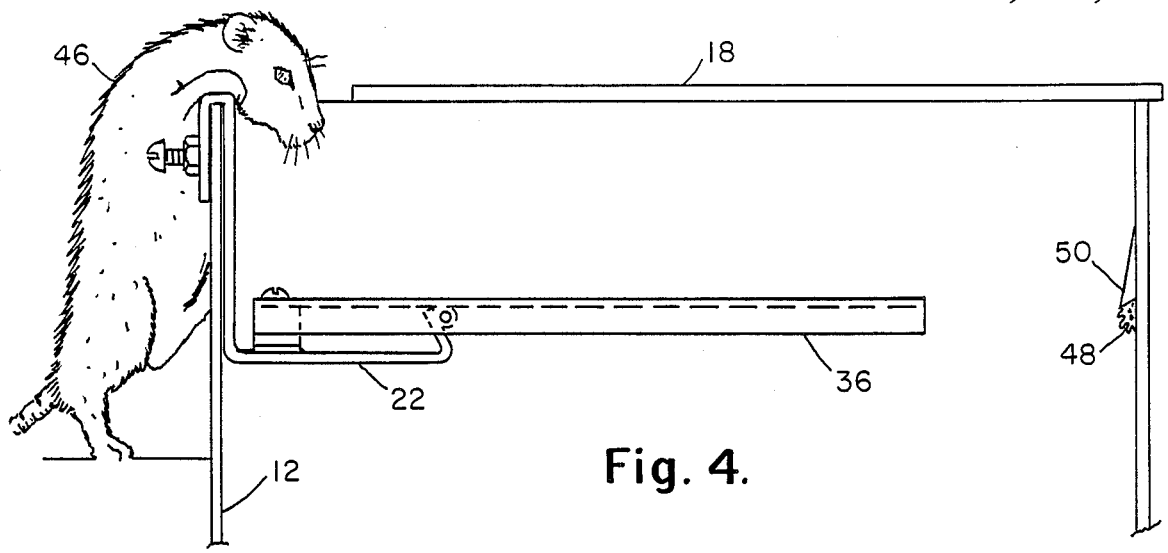
FIG. 4, is a side view of the invention depicted in FIG. 1 and FIG. 2 showing a mouse about to enter the trap.

DETAILED DESCRIPTION OF THE INVENTION:

Referring to the drawings, and in particular to FIG. 1, there is shown species (1) of the invention, the clampable trap 10 clamped to the inside of a can 12 which contains water reservoir 14. An identical form of the invention is shown in FIG. 2 which has the trap 10 clamped to the inside portion of a rectangular cylindrical water container 16 which contains a water reservoir 14. A cover top 18 is positioned on the top of both can 12 and water container 16 leaving an opening directly above the entrance to the trap. This opening 20 allows the animal to crawl into the trap only at the entrance opening and not be admitted elsewhere. Cover top 18 may be loose upon can 12 or container 16, have a retaining weight thereon (not shown), or be removably fastened thereon. Cover top 18 may be made of transparent material such as plastic.

Referring now to FIG. 3, an L-shaped clamping member 22 has on its end portion a clamp element 24 bent in a C-shape to allow its positioning on the edge of a can or other receptacle. A clamp nut 26 is secured to the outer portion of clamp element 24 and receives a threaded clamp screw 28 which extends through the outer side of clamping member 22 to bear against the inside of clamping member 22. As may be seen the clamping element 24 may be placed over the edge of can 12 and clamping nut 26 screwed against can 12 to secure the clamping member 22 in position. The opposite end portion of clamping member 22 is bent in an inwardly facing V-shape reset stop 30, the end of which contains a tubular pivot 32 adapted to receive a pivot pin 34.

A C-shaped tiltable walkway 36 has pivot holes 38 through the side portion thereof adapted to receive pivot pin 34. Pivot pin 34 extends through pivot holes 38 in the sides of a walkway 36 through tubular pivot 32 and again through a pivot hole 38. Pivot pin 34 acts as a fulcrum allowing the walkway 36 to tilt and pivot upon pivot pin 34. A magnetic anvil 40 is secured to the lower end portion of walkway 36 by anvil screw 42 which exends through the upper portion of walkway 36 and is thread connected to magnetic anvil 40. Magnetic anvil 40 is usually comprised of a ferrous material such as iron or steel which would be attracted by a magnet.

A permanent ferro magnet 44 is integrally attached to the upper portion of clamping member 22 and so positioned that magnetic anvil 40 contacts it when it tilts upon pivot pin 34. The force of magnetic attraction of magnet 44 to magnetic anvil 40 maintains walkway 36 in an approximate horizontal position when the clamping member 22 is clamped upon a vertical surface such as a can. When sufficient force is applied to the end portion of walkway 36 the magnetic contact between magnetic anvil 40 and magnet 44 is broken and the walkway 36 then rotates about pivot pin 34 plunging the end portion of walkway 36 downward. When walkway 36 is in its extreme downward position, its bottom portion will contact and be stopped by reset stop 30 which prevents any further downward rotation motion. In this position, the weight and moment of magnetic anvil 40 is positioned well over pivot pin 34 thus exerting a moment force which causes walkway 36 to tilt backward until magnetic anvil 40 is again in contact with magnet 44. In this way the clampable trap 10 will reset itself after the tilting of walkway 36.

Figure 5:
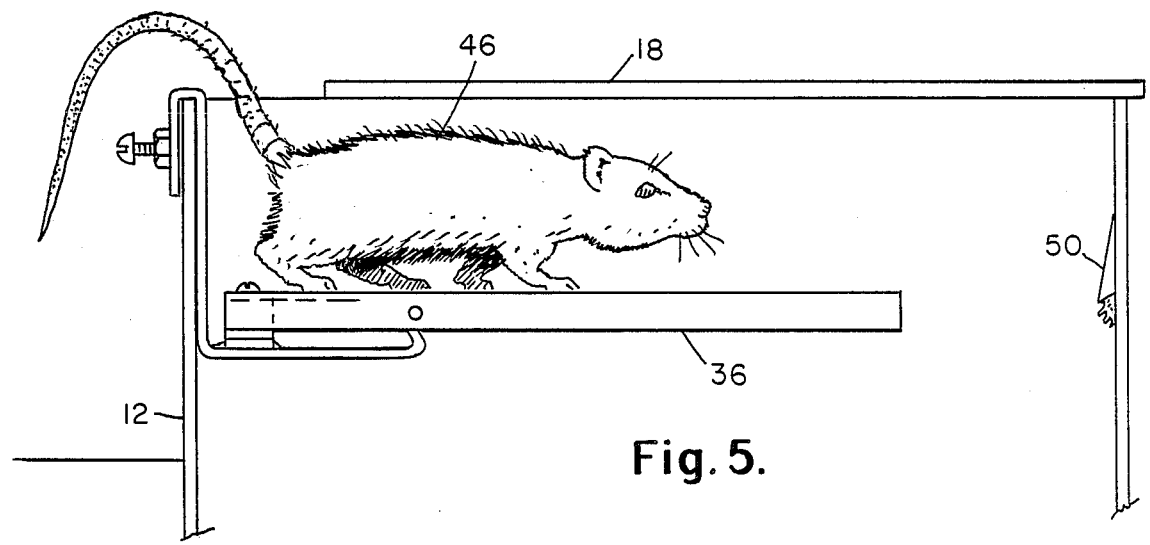
FIG. 5, is a side view of the trap mechanism of FIGS. 1 and 2, showing a mouse within the trap and proceeding upon the tilting walkway.
Figure 6:
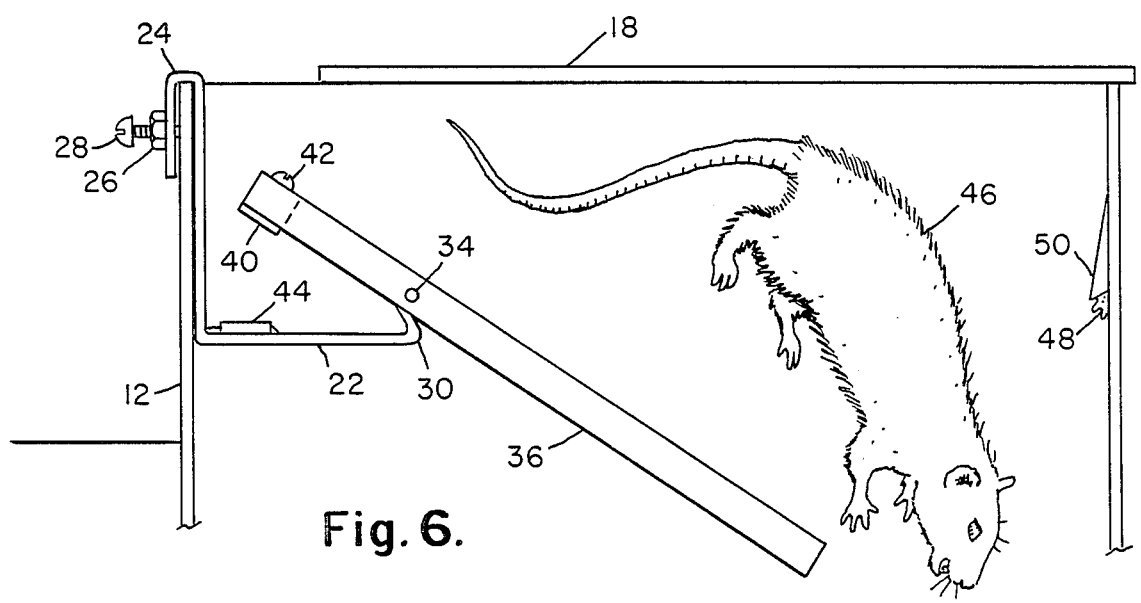
FIG. 6, is a side view of the trap mechanism of FIGS. 1 and 2, showing the tilting walkway sprung and the mouse falling into the water reservoir below.

The operations of the trap may be seen more clearly by referring to FIGS. 4, 5 and 6. The mouse 46 climps up to the opening 20 attracted by the odor of bait 48 which is attached to the bait wedge 50 on the inside of can 12. The bait may consist of cheese, peanut butter or other substance which emits an odor and will readily stick to the downwardly facing bait wedge 50. To assist the mouse in climbing up to opening 20 a hooked end climbing member 52 may be leaned against the can 12 at opening 20 (FIG. 1). The hooked end climbing member 52 maintains its position because of the hook and allows the mouse to easily climb up to the opening 20. The mouse 46 smells the bait 48 (see FIG. 4) climbs in opening 20 and begins to walk outwardly upon walkway 36 toward the bait 48. When the weight of the mouse 46 is sufficient, the magnetic contact of magnet 44 and magnetic anvil 40 is broken and the walkway 36 tilts upon pivot pin 34 (see FIG. 6) causing the mouse 46 to fall into the water reservoir 14 below. Walkway 36 then retilts in the opposite direction until magnet 44 is again in contact with magnet anvil 40 thus resetting the trap and making it ready for a second mouse to enter.

It should be noted that the magnetic force between magnet 44 and magnetic anvil 40 is adjusted so that the weight of a mouse is sufficient to break the magnetic contact. This is frequently done by varying the size and strength of the magnet 44. A larger animal of course would require a greater magnetic contact.

Figure 7:
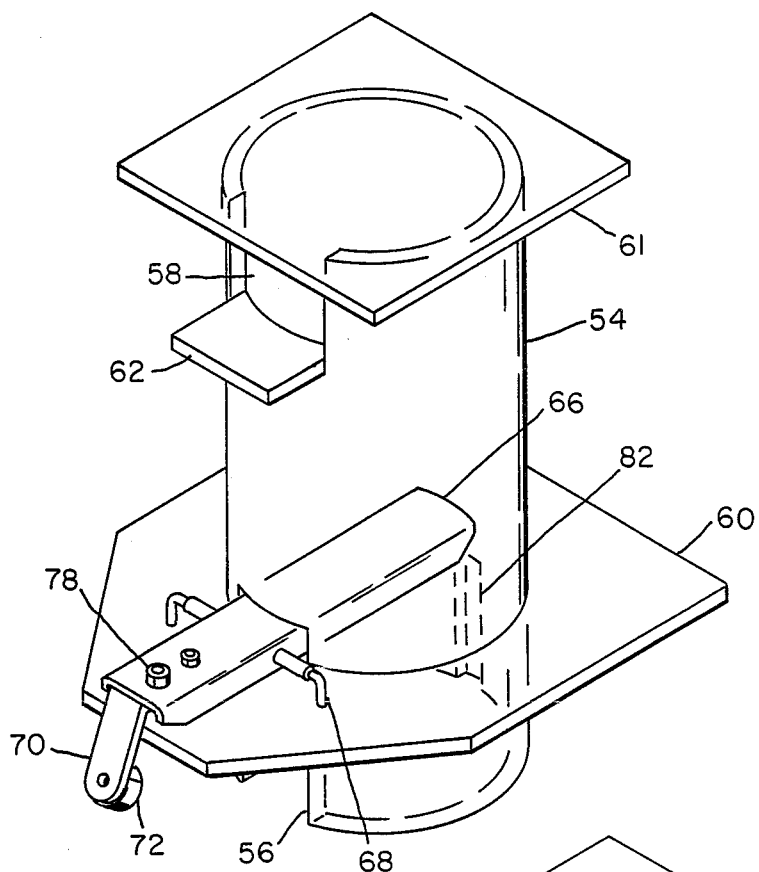
FIG. 7, is a third dimensional view of a second species of the invention with the tilting walkway in its horizontal position waiting for the entry of an animal.
Figure 8:
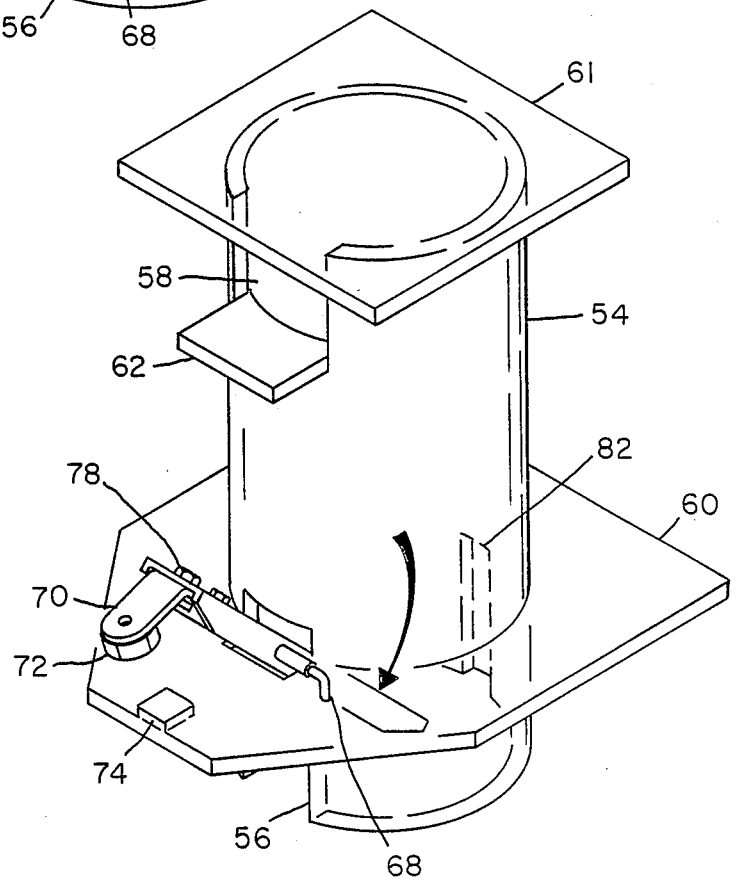
FIG. 8, is a third dimensional view of the device of FIG. 7, showing the trap sprung with the walkway pivoting and releasing the animal into the water reservoir (not shown) below.

The species (2) of this invention is illustrated by FIGS. 7 and 8. This modification is essentially that of species (1) except that a contained trap is adapted to be set on the top of a can or jar which provides the water reservoir into which the trapped animal would be dropped. Species (2) of the present invention is comprised of a cylindrical outer shell 54 having a walkway slot 56 at the lower portion thereof and an entrance slot 58 at the upper end thereof, for the entrance of the mouse. A container supported disc 60 is attached perpendicular to the outer shell 54 at approximately the upper portion of the walkway slot 56 and serves as a support for the device to be placed on top of a jar, can or other receptacle which would contain water. Walkway slot 56 extends through outer shell 54 and also through the supported disc 60 immediately adjacent. Walkway slot 56 is large enough to admit a walkway 66 which extends through walkway slot 56 and into the interior of outer shell 54. A cover 61 is integrally attached to the top portion of outer shell 54 to prevent the entrance of animals other than through entrance slot 58. A platform 62 extends outwardly from the lower portion of entrance slot 58 to support the animal passing through entrance slot 58. The platform 62 may be omitted from the trap, at the discretion of the user.

The trap mechanism is very similar to that previously described as species (1). A walkway 66 is pivoted upon a C-shaped pivot rod 68 which extends through the sides of walkway 66. The ends of pivot rod 68 extend into the container supported disc 60 which holds the pivot rod 68 rigid. An openinggn in container supported disc 60 under pivot rod 68 allows walkway 66 to rotate to an approximate vertical position. When walkway 66 has rotated to an approximate vertical position it contacts container supported disc 60 of walkway slot 56 which prevents further rotation. Container supported disc 60 is placed on the top of a can, jar or other container (not shown). A counter weight arm 70 is attached to the end portion of walkway 66 and extends outwardly therefrom This counter weight arm 70 has a counter weight 72 attached to the end portion. The counter weight arm 70 and counter weight 72 urge the walkway 66 to rotate back to its original position after it has been tilted. A magnet 74 is attached to the counter supported disc 60 to contact a magnetic anvil 76 when the walkway 66 is approximately horizontal. Anvil 76 is attached to walkway 66 by means of nut and screw 78 which extend through walkway 66.

The operation, species (2) is similar to that of species (1). The mouse gains entrance to the trap through entrance 58 and steps upon walkway 66. He walks outwardly on walkway 66 being attracted by the odor of bait which is secured in a bait slot 82 vertically positioned in the bottom portion of outer shell 54 opposite the end of walkway 66. Bait slot 82 does not extend through outer shell 54. When the mouse has walked outwardly on walkway 66, the magnetic contact between the magnet 74 and the magnetic anvil 76 is broken allowing the walkway 66 to pivot or tilt upon the pivot rod 68 thus plunging the mouse downward into a water reservoir below. The walkway 66 urged by counter weight 72 then rotates back to its original position, resetting the trap. As may be seen species (2) of this trap (FIGS. 7 and 8) allows the trap to be placed upon a convenient jar, container or other objects. The trap in general is made of transparent plastic material which allows its internal portion to be in constant view.

Although the mechanism of this invention has been described with a certain degree of specificity, it is understood that numerous changes in function, in operation and design can be made without departing from the spirit of the invention.

What is claimed is:

1. A trap for mouse size animals adapted for attachment to a container having substantially vertical walls with a substantially flat top, comprising in combination:
   a clamping means adapted to be secured to the top of said container walls, comprising in combination:
      a downwardly disposed slotted member adapted to fit over the top of said vertical walls of said container;
      a hanging bracket integrally attached to said slotted member extending downwardly within said container;
      a rotatable screw extending through said slotted member and adapted to clamp said vertical walls of said container;
   a walkway pivotally attached to said hanging bracket and adapted to allow said walkway to rotate;
   a magnetic release device attached to said walkway and to said hanging bracket;
   a bait holding device attached to said container;
   a reset device attached to said walkway adapted to rotate said walkway to its set position.

2. The combination as claimed in claim 1, in which said magnetic release device is comprised of, in combination:
   a permanent magnet attached to said hanging bracket;
   a magnetic attracting anvil attached to said walkway, said magnet attracting anvil in contact with said permanent magnet when said walkway is in an approximate horizontal position;
   a flat cover positioned on top of said container adapted to form an animal entrance opening and to guide said animal along said walkway;
   said hanging bracket extending within said container a sufficient distance to allow said walkway to pivot without stricking said flat cover;
   a reset device attached to said hanging bracket comprised of, in combination;
      a V-shape immovable stop extending outwardly from said hanging bracket and into the path of said pivoting walkway adapted to intersect said walkway and reverse its direction of rotation;
      a counter weight attached to the end portion of said walkway.

3. The combination as claimed in claim 2, having a climbing member with a hook on the end portion thereof, said hook adapted to engage the top portion of the walls of said container and to be position adjustable.

4. A trap for mouse size animals adapted to be positioned upon a container comprising, in combination:
   a container supported member positionable upon said container;
   an outer shell attached to said container supported member, having a walkway slot therethrough and an entrance way positioned above said walkway slot;
   a rotatable walkway positioned in said walkway slot and extending within said outer shell;
   a pivot attached to said container supported member and to said rotatable walkway;
   a downwardly disposed bait groove positioned in said outer shell opposite said walkway slot and below said rotatable walkway, said downwardly disposed bait groove having no bottom portion thereon;
   a permanent magnet attached to said container supported members;
   a magnetic anvil attached to the end portion of said rotatable walkway adapted to contact said permanent magnet when said walkway is in an approximate horizontal position;
   a counter weight arm attached to said rotatable walkway and extending outwardly and away from said rotatable walkway;
   a counter weight attached to the end portion of said counter weight arm and adapted to rotate said rotatable walkway to its set position.

5. The combination as claimed in claim 4, having a walkway stop positioned on the end portion of said rotatable walkway adapted to contact said outer shell when said rotatable walkway is rotating and to reverse the direction of said rotatable walkway to its set position.

* * * * *